(12) United States Patent
Mavroeidis et al.

(10) Patent No.: US 11,521,064 B2
(45) Date of Patent: Dec. 6, 2022

(54) TRAINING A NEURAL NETWORK MODEL

(71) Applicant: KONINKLIJKE PHILIPS N.V., Eindhoven (NL)

(72) Inventors: Dimitrios Mavroeidis, Utrecht (NL); Binyam Gebrekidan Gebre, Rosmalen (NL); Stojan Trajanovski, London (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 274 days.

(21) Appl. No.: 16/768,783

(22) PCT Filed: Nov. 30, 2018

(86) PCT No.: PCT/EP2018/083102
§ 371 (c)(1),
(2) Date: Jun. 1, 2020

(87) PCT Pub. No.: WO2019/106136
PCT Pub. Date: Jun. 6, 2019

(65) Prior Publication Data
US 2020/0372344 A1    Nov. 26, 2020

(30) Foreign Application Priority Data
Dec. 1, 2017 (EP) .................................. 17204976

(51) Int. Cl.
*G06N 3/08* (2006.01)
*G06T 7/70* (2017.01)
*G06T 7/00* (2017.01)

(52) U.S. Cl.
CPC ............. *G06N 3/08* (2013.01); *G06T 7/0002* (2013.01); *G06T 7/70* (2017.01)

(58) Field of Classification Search
CPC ..................... G06T 7/0002; G06T 7/70; G06T 2207/20081; G06T 7/11; G06T 7/0014;
(Continued)

(56) References Cited

U.S. PATENT DOCUMENTS

2016/0307096 A1    10/2016 Goel et al.
2016/0307098 A1    10/2016 Goel et al.
(Continued)

OTHER PUBLICATIONS

Xiao, et al., "Learning Deep Feature Representations with Domain Guided Dropout for Person Re-idenfication", 2016 IEEE Conference on Computer Vision and Pattern Recognition, Jun. 27, 2016, pp. 1249-1258.

(Continued)

*Primary Examiner* — Xilin Guo

(57) ABSTRACT

A concept for training a neural network model. The concept comprises receiving training data and test data, each comprising a set of annotated images. A neural network model is trained using the training data with an initial regularization parameter. Loss functions of the neural network for both the training data and the test data are used to modify the regularization parameter, and the neural network model is retrained using the modified regularization parameter. This process is iteratively repeated until the loss functions both converge. A system, method and a computer program product embodying this concept are disclosed.

13 Claims, 4 Drawing Sheets

(58) Field of Classification Search
CPC ......... G06T 7/60; G06T 3/4046; G06N 3/082; G06N 3/08; G06N 3/0454; G06N 20/00; G06V 10/82; G06V 20/698

See application file for complete search history.

(56) References Cited

U.S. PATENT DOCUMENTS

| | | | |
|---|---|---|---|
| 2017/0169315 A1 | 6/2017 | Vaca Castano et al. | |
| 2017/0337682 A1* | 11/2017 | Liao | G06T 7/0012 |
| 2018/0232601 A1* | 8/2018 | Feng | G06K 9/6262 |
| 2019/0138887 A1* | 5/2019 | Salem | G06F 17/16 |
| 2019/0286936 A1* | 9/2019 | Fuchs | G06K 9/6267 |

OTHER PUBLICATIONS

Guo, et al., "Dynamic Network Surgery for Efficient DNNS", Aug. 16, 2016, Retrieved from the Internet: URL:https://arxiv.org/abs/1608.04493vl[retrieved on Feb. 18, 2019], pp. 1-9 (Abstract).

International Search Report and Written Opinion for International Application No. PCT/EP2018/083102, filed Nov. 30, 2018, 15 pages.

Rennie, et al., "Annealed Dropout Training of Deep Networks", 2014 IEEE Spoken Language Technology Workshop, Date of Conference Dec. 7-10, 2014, 6 pages (Abstract).

Kingma, et al., "Variational Dropout and the Local Reparameterization Trick", Machine Learning, pp. 1-14 (Abstract).

Li, et al., "Improved Dropout for Shallow and Deep Learning", 30th Conference on Neural Information Processing Systems (NIPS 2016), Barcelona, Spain, pp. 1-9.

Srivastava, et al., "Dropout: A Simple Way to Prevent Neural Networks from Overfitting", Journal of Machine Learning Research 15, (2014), pp. 1929-1958.

Hinton, et al., "Improving neural networks by preventing co-adaption of feature detectors", Computer Science, Neural and Evolutionary Computing, Jul. 3, 2012, pp. 1-18.

Goodfellow, et al., "Maxout Networks", Proceedings of Machine Learning Research, PMLR 28(3): 2013, pp. 1319-1327.

Ba, et al., "Adaptive dropout for training deep neural networks", Proceedings of the 26th International Conference on Neural Information Processing System, vol. 2, Dec. 2013, pp. 3084-3092.

Gu, et al., "Recent Advances in Convolutional Neural Networks", Pattern Recognition, vol. 77, May 2018, pp. 354-377.

Wang, et al., "Fast dropout training", Proceedings of Machine Learning Research, 2013, vol. 28, No. 2, pp. 118-126.

* cited by examiner

TRAINING A NEURAL NETWORK MODEL

RELATED APPLICATIONS

This application is the U.S. National Phase application under 35 U.S.C. § 371 of International Application No. PCT/EP2018/083102, filed on Nov. 30, 2018, which claims the benefit of European Application No. 17204976.9, filed Dec. 1, 2017. These applications are incorporated by reference herein.

FIELD OF THE INVENTION

The invention relates to training a neural network model and, in particularly, to training a neural network model using regularization techniques.

BACKGROUND OF THE INVENTION

Artificial neural networks (referred to herein as "neural networks") are known for their use in modelling analysis problems, such as image analysis problems. A deep learning architecture, or deep neural network, is a particular type of neural network which is capable of modelling more complex analysis problems.

Neural network architectures include multiple units, referred to as artificial neurons, or simply neurons, arranged in layers, which are configured to simulate the neurons of a brain. Each layer in a neural network model may perform a different transformation on its input. Neurons in a neural network are connected to one or more other neurons in the network by one or more connections, or edges. Each neuron or edge may have an associated weight (which may be referred to as a bias), which is applied to the output from the neuron, or to the connection from one neuron to a connected neuron. The weights can be updated with training of the neural network, for example using training data. A signal (e.g. data), travels from a first, input layer of a neural network to the last, output layer of the network, and may traverse one or more intermediate, "hidden" layers. With training, the weights are updated such that the output of the neural network becomes closer to the expected output.

The complexity and large number of parameters involved in neural network models (and particularly in deep learning neural networks) increases the likelihood that "overfitting" will occur. Overfitting occurs when a complex model overreacts to minor fluctuations in data used to train the model. An output of a model in which overfitting has occurred may be of little or no use, and may result in the need to retrain the model.

Thus, there is a need for an improved way of training a neural network model which reduces the likelihood of overfitting occurring.

SUMMARY OF THE INVENTION

According to a first aspect, there is a system configured for training a neural network model comprises a memory comprising instruction data representing a set of instructions; and a processor configured to communicate with the memory and to execute the set of instructions. The set of instructions, when executed by the processor, cause the processor to receive training data comprising a first set of annotated images; receive test data comprising a second set of annotated images; train the neural network model using the training data, based on an initial regularization parameter; iteratively perform steps of: testing the trained neural network model using the test data to determine a loss function of the trained neural network model for the test data; adjust the initial regularization parameter based on the loss function of the neural network model for the training data and the loss function of the neural network model; re-train the neural network model using the training data, based on the adjusted regularization parameter, wherein the iterative steps are performed until it is determined that the loss function for the training data and the loss function for the test data have both converged to a steady state.

By adjusting the regularization parameter based on the loss function for the training data and the test data, an assessment can be made as to whether the trained neural network is suffering from overfitting, thereby enabling a directed adjustment to the regularization parameter to be made. This thereby enables a more accurate neural network to be generated, and the loss function of the neural network to be reduced more effectively.

The adjustment to the regularization parameter is iteratively repeated the loss function for both the test data and the training data has converged (e.g. been minimized). Such convergence indicates that further training is no longer required, i.e. the neural network has been optimized based on available data.

The training data and the test data are different and separate to one another, but may be formed from different parts of a larger annotated image dataset.

In some embodiments, the regularization parameter may comprise at least one of a dropout parameter, relating to neurons in the neural network model, or a dropconnect parameter, relating to connections between neurons in the neural network model.

The adjustment made to the regularization parameter may be based on the change in the loss function between iterations. In some embodiments, the regularization parameter adjustment may be based on a convergence of the loss function between iterations.

The adjustment made to the regularization parameter may be based on or determined using the difference between the loss function of the neural network model for the training data and the loss function of the neural network model for the test data. In other words, a comparison may be made between the loss function of the neural network model for the training data and the loss function of the neural network model for the test data in order to determine how to modify the regularization parameter. The present invention has recognized that such a comparison enables an accurate determination of whether the neural network is overfitting and/or underfitting, and can thereby be used to direct the modification to the regularization parameter.

By comparing the loss function for the test data to the loss function for the training data, a method can be sure that a poor loss function of the test data is due to overfitting rather than an incorrectly trained neural network, thereby more accurately establishing whether overfitting has occurred and thereby how the regularization parameter ought to be changed.

Causing the processor to adjust the regularization parameter may comprise causing the processor to increase the regularization parameter when it is determined that the loss function of the model is higher for the test data than for the training data. Thus, embodiments may test for overfitting by comparing the test data to the training data, and (in response to the loss function for the test data being higher than the loss function for the training data) modifying the neural network to account for the overfitting by increasing the regularization parameter.

In some preferable embodiments, causing the processor to adjust may comprise causing the processor to increase the regularization parameter when it is determined that the loss function of the model is higher for the test data than for the training data and the loss function has minimized for the training data. This effectively checks whether the neural network has been fully trained using the training data, but is overfitting for the training data. In this way, a more accurate determination of whether overfitting is occurring can be performed.

In some embodiments, causing the processor to adjust the regularization parameter may comprise causing the processor to decrease the regularization parameter when it is determined that the loss function of the neural network model is higher for the training data than for the test data.

In some embodiments, causing the processor to adjust the regularization parameter comprises causing the processor to decrease the regularization parameter when it is determined that the loss function of the neural network for the training data is similar to the loss function for the test data (e.g. within a predetermined range of one another, such as ±1% or ±5%). In particular, it may be determined whether the loss function for the test data lies within a predetermined range (e.g. ±1% or ±5%) of the loss function for the training data, and determining to decrease the regularization parameter in response to a positive determination. Thus, an assessment may be made as to whether the neural network has been trained without overfitting, thereby enabling the processor to decrease the regularization parameter to enable further training of the neural network. The regularization parameter may also be decreased if the loss function for the test data is less than the loss function for the training data (as this could indicate that underfitting is occurring).

In further embodiments, the step of causing the processor to increase the regularization parameter when it is determined that the loss function of the model is higher for the test data than for the training data is modified so that the step of increasing the regularization parameter only occurs when the loss function of the model for the test data is higher than the upper bound of the predetermined range for determining similarity for the loss function of the training data (e.g. more than 105% of the value of the loss function for the training data or more than 101% of the value of the loss function for the training data).

Training the neural network model may comprise iteratively training the neural network model using the training data until a loss function of the neuron network model for the training data converges to a steady state. Thus, in embodiments, the regularization parameter may be modified only when the neural network has been trained to convergence. This improves an accuracy of the neural network.

Causing the processor to re-train the neural network model may, in some embodiments, comprise causing the processor to set weights of neurons in one or more layers of the model based on weights of the neurons during the preceding iteration.

The set of instructions, when executed by the processor may further cause the processor to conclude training of the neural network model when it is determined that the loss function is minimized for the training data and the test data.

In some embodiments, the loss function of the model may be considered to have converged to a steady state when the loss function changes by less than a defined amount between subsequent iterations.

The training data and the test data may, in some embodiments, comprise images annotated with at least one of: an indication of the presence of an object in the image; and an indication of the location of an object in the image. In some embodiments, the training data and the test data may comprise medical images.

The regularization parameter may define a proportion of neurons or connections between neurons to be temporarily excluded from a particular layer of the neural network model during training.

According to a second aspect, a method of training a neural network model comprises receiving training data comprising a first set of annotated images; training the neural network model using the training data, based on an initial regularization parameter; and iteratively performing steps of: testing the trained neural network model using the test data to determine a loss function of the trained neural network model for the test data; adjusting the initial regularization parameter based on the loss function of the neural network model for the training data and the loss function of the neural network model; re-training the neural network model using the training data, based on the adjusted regularization parameter, wherein the iterative steps are performed until it is determined that the loss function for the training data and the loss function for the test data have both converged to a steady state.

According to a third aspect, a computer program product comprises a non-transitory computer readable medium, the computer readable medium having computer readable code embodied therein, the computer readable code being configured such that, on execution by a suitable computer or processor, the computer or processor is caused to perform the methods disclosed herein.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF EMBODIMENTS

Figures 1A, 1B:
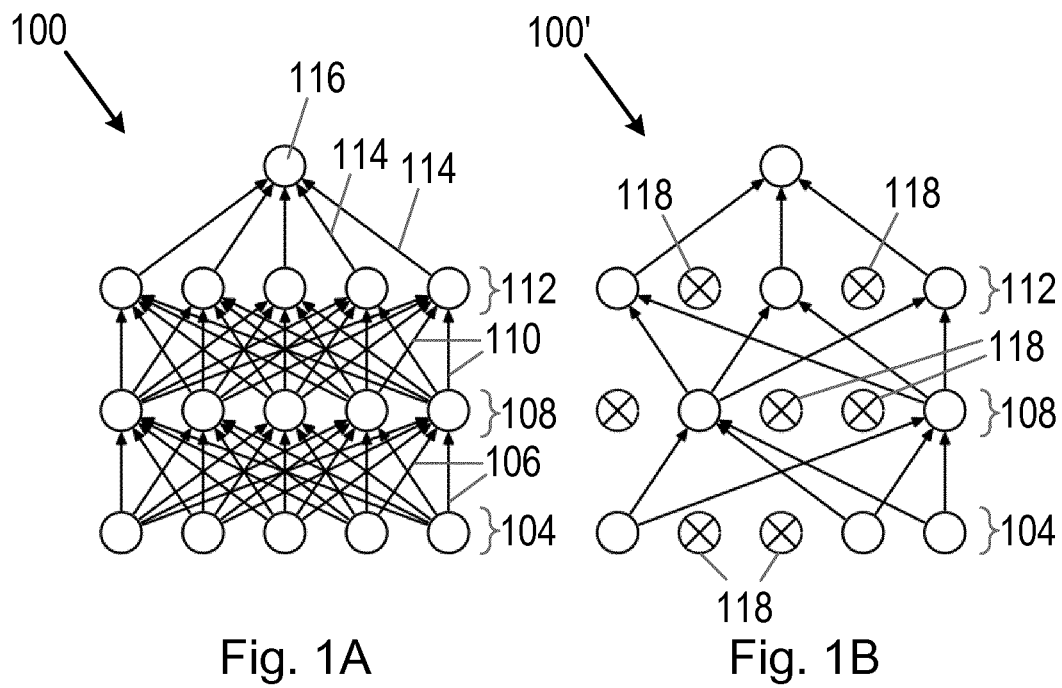
FIG. 1A is a simplified schematic of an example of a neural network.
FIG. 1B is a simplified schematic of the neural network of FIG. 1A with a dropout parameter applied.

Artificial neural networks or, simply, neural networks, will be familiar to those skilled in the art, but in brief, a neural network is a type of model that can be used to classify data (for example, classify, or identify the contents of image data). The structure of a neural network is inspired by the human brain. Neural networks are comprised of layers, each layer comprising a plurality of neurons. Each neuron comprises a mathematical operation. In the process of classifying a portion of data, the mathematical operation of each neuron is performed on the portion of data to produce a numerical output, and the outputs of each layer in the neural network are fed into the next layer sequentially. Generally, the mathematical operations associated with each neuron comprise one or more weights that are tuned during the training process (e.g. the values of the weights are updated during the training process to tune the model to produce more accurate classifications).

For example, in a neural network model for classifying the contents of images, each neuron in the neural network may comprise a mathematical operation comprising a weighted linear sum of the pixel (or in three dimensions, voxel) values in the image followed by a non-linear transformation. Examples of non-linear transformations used in neural networks include sigmoid functions, the hyperbolic tangent function and the rectified linear function. The neurons in each layer of the neural network generally comprise a different weighted combination of a single type of transformation (e.g. the same type of transformation, sigmoid etc., but with different weightings). As will be familiar to the skilled person, in some layers, the same weights may be applied by each neuron in the linear sum; this applies, for example, in the case of a convolution layer. The weights associated with each neuron may make certain features more prominent (or conversely less prominent) in the classification process than other features and thus adjusting the weights of neurons in the training process trains the neural network to place increased significance on specific features when classifying an image. Generally, neural networks may have weights associated with neurons and/or weights between neurons (e.g. that modify data values passing between neurons).

As briefly noted above, in some neural networks, such as convolutional neural networks, lower layers such as input or hidden layers in the neural network (i.e. layers towards the beginning of the series of layers in the neural network) are activated by (i.e. their output depends on) small features or patterns in the portion of data being classified, while higher layers (i.e. layers towards the end of the series of layers in the neural network) are activated by increasingly larger features in the portion of data being classified. As an example, where the data comprises an image, lower layers in the neural network are activated by small features (e.g. such as edge patterns in the image), mid-level layers are activated by features in the image, such as, for example, larger shapes and forms, whilst the layers closest to the output (e.g. the upper layers) are activated by entire objects in the image.

In general, the weights of neurons in the final layers of a neural network model (known as the output layers) are most strongly dependent on the particular classification problem being solved by the neural network. For example, the weights of outer layers may heavily depend on whether the classification problem is a localization problem or a detection problem. The weights of lower layers (e.g. input and/or hidden layers) tend to depend on the contents (e.g. features) of the data being classified and therefore it has been recognized herein that the weights in input and hidden layers of neural networks processing the same type of data may, with enough training, converge towards the same values over time, even if the outer layers of the models are tuned to address different classification problems.

As noted above, a problem which can affect neural networks is overfitting. A technique which may be used to reduce overfitting in neural network models is to apply a regularization technique, such as "dropout" or "dropconnect". Dropout refers to a regularization technique in which some neurons, or units, of a neural network model are ignored or excluded for part of the training of a model using training data. Dropconnect refers to a regularization technique in which some connections between neurons in a neural network model are ignored or excluded for part of the training of a model using training data. Ignoring some of the neurons or connections between neurons forces the neural network to learn multiple independent representations of the same data. Dropout and/or dropconnect help the neural network to generalize better, and help to avoid the model developing a reliance on a (possibly dominating) single neuron or connection (i.e. edge) in the neural network.

In some examples, neurons or edges may be ignored by temporarily setting the neuron's or edge's associated weight to zero.

In some cases, regularization (e.g. dropout or dropconnect) may involve neurons being ignored or excluded from a single layer (or connections being ignored or excluded between neurons in two adjacent layers) in the neural network model while, in other cases, neurons from multiple layers (or connections between multiple adjacent layers) may be excluded. Not all of the neurons or connections in a particular layer need be excluded during training of the model (e.g. during each step of the training process, which may comprise a random batch of the total set of training data). The proportion of neurons or connections in a particular layer that are temporarily ignored (i.e. omitted or "dropped" during a step of the training) may be defined by a regularization parameter, which may range from 0 to 1, where 0 represents a situation where none of the neurons or connections are excluded, and 1 represents a case where all of the neurons or connections in a layer are excluded. For example, a regularization parameter of 0.5 represents a case where half of the neurons or connections in a particular layer are temporarily excluded. Thus, the regularization parameter defines a proportion of neurons or connections between neurons to be temporarily excluded from a particular layer of the neural network model during training. In some cases, a unique regularization parameter may be applied to each individual neuron or connection. In some cases, a single regularization parameter may be applied to a small group or subset of neurons or connections. In some cases, a single regularization parameter may be applied to all of the neurons in a particular layer or to all of the connections between two adjacent layers. In some cases, a single regularization parameter may be applied to all of the neurons or connections in the neural network.

The neurons or connections that are excluded in a layer may be chosen at random, or may be predefined. When a dropout regularization technique is applied, the regularization parameter may be referred to as a dropout parameter, and when a dropconnect regularization technique is applied, the regularization parameter may be referred to as a dropconnect parameter.

Other regularization parameters would be recognized by the skilled person, such as a learning rate, number of active layers and so on. In some examples, a regularization parameter may define an optimizer of the neural network (i.e. the optimizer used to modify the neural network during a training process).

The performance quality of a neural network may be defined by a loss function (also referred to as a cost function). A loss function is a measure of how far away a particular solution (e.g. a model having a particular combination of neuron weights) is from an optimal solution to a problem being solved. A loss function (or loss function value) for a neural network model can be said to be minimized when the model returns the optimal solution. In some examples, a minimized loss function may have a value of zero. As the neural network is trained using training data, weights of the neurons and/or the edges connecting the neurons are adjusted in an attempt to cause the loss function to converge to an optimal value (i.e. to a value corresponding to an optimal solution).

The inventors have discovered that the regularization technique can be improved by basing adjustments of the regularization parameter (i.e. the way in which the proportion of neurons or connections that are ignored is varied during training of a neural network model) on the loss function. More specifically, it has been discovered that the accuracy of a neural network model can be improved by varying the regularization parameter based on the loss function for training data and the loss function for test data (which isn't used to train the neural network, but rather to test its validity).

Thus, there is proposed a concept for training a neural network model. The concept comprises receiving training data and test data, each comprising a set of annotated images. A neural network model is trained using the training data with an initial regularization parameter. Loss functions of the neural network for both the training data and the test data are used to modify the regularization parameter, and the neural network model is retrained using the modified regularization parameter. This process is iteratively repeated until the loss functions both converge. A system, method and a computer program product embodying this concept are disclosed.

Examples of the use of dropout and dropconnect as regularization techniques are shown in FIGS. 1 and 2 respectively.

FIG. 1 is a simplified schematic of two examples of neural networks 100, 100'. FIG. 1A shows a neural network 100 with no dropout (i.e. none of the neurons are ignored), and FIG. 1B shows a neural network 100' with dropout parameters for the individual layers of between 0.4 and 0.6. In FIG. 1A, the neural network 100 includes a plurality of neurons 102, arranged in layers. Neurons 102 in an input layer 104 are connected by edges 106 to neurons 102 in a first intermediate layer 108. The neurons 102 in the first intermediate layer 108 are connected by edges 110 to neurons 102 in a second intermediate layer 112. The neurons 102 in the second intermediate layer 110 are connected by edges 114 to a neuron in an output layer 116. The neural network represented in FIG. 1A can be considered to have a dropout parameter of zero, such that none of the neurons are ignored or excluded.

In the neural network 100' of FIG. 1B, various neurons 118 are excluded or ignored. In the example shown, a dropout parameter of 0.4 has been applied to the input layer 104, thereby causing two randomly selected neurons 118 to be temporarily ignored during training (denoted by crosses in the neurons). In the first intermediate layer 108, a dropout parameter of 0.6 has been applied, thereby causing three randomly selected neurons 118 to be temporarily ignored during training. In the second intermediate layer 112, a dropout parameter of 0.4 has been applied, thereby causing two randomly selected neurons 118 to be temporarily ignored during training. As a result of the dropout parameter having been applied, fewer neurons 102 are active, resulting in fewer activations (i.e. outputs from neurons) during training.

While FIG. 1 demonstrates dropout (i.e. temporarily dropping neurons from the neural network during training), FIG. 2 demonstrates dropconnect, where neurons remain in use, but some of the interconnections between neurons in adjacent layers are temporarily dropped and ignored during training.

Figures 2A, 2B:
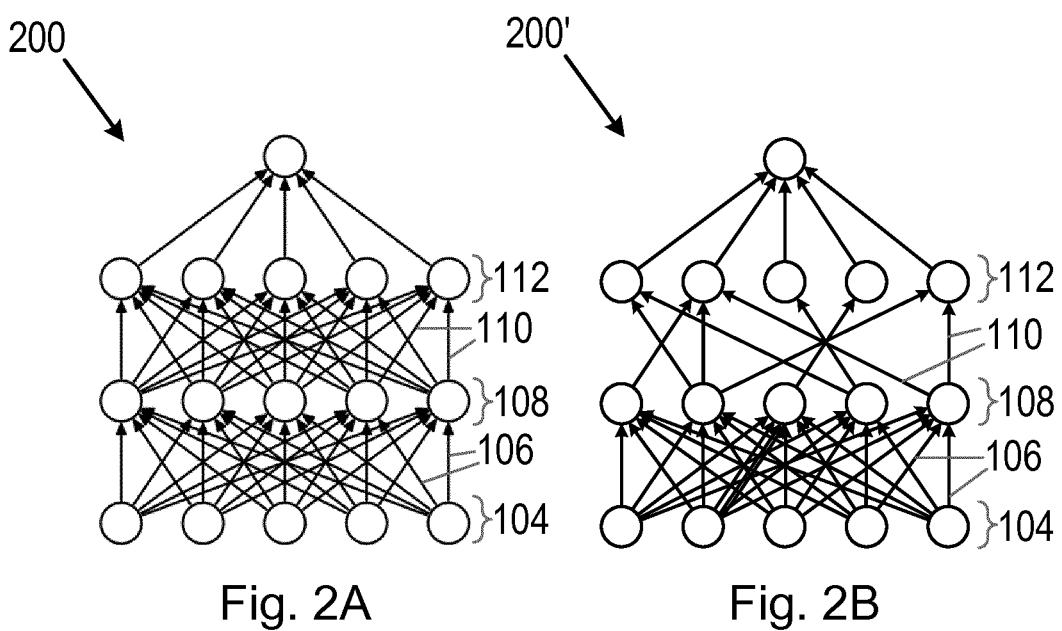
FIG. 2A is a simplified schematic of an example of a neural network.
FIG. 2B is a simplified schematic of the neural network of FIG. 2A with a dropconnect parameter applied.

FIG. 2 is a simplified schematic of two examples of neural networks 200, 200'. FIG. 2A shows a neural network 200 which is the same as the neural network 100, in which none of the connections are ignored, and FIG. 2B shows a neural network 200' in which some of the connections 110 between the first intermediate layer 108 and the second intermediate layer 112 are ignored. For clarity, the ignored connections are not shown in FIG. 2B. In this example, none of the connections 106 between the input layer 104 and the first intermediate layer 108 are ignored. Thus, in the example of FIG. 2B, the connections 106 between the input layer 104 and the first intermediate layer 108 can be considered to have a dropconnect parameter of zero, while the connections 110 between the first intermediate layer 108 and the second intermediate layer 112 can be considered to have a dropconnect parameter of 0.64, such that sixteen randomly selected connections are temporarily ignored during training. As a result of the dropconnect parameter having been applied, fewer connections 110 are active, resulting in fewer activations (i.e. outputs) of neurons in the second intermediate layer 112 during training.

As noted above, a regularization parameter may be applied on a layer-by-layer basis, such that each layer (or connections between a particular adjacent pair of layers) may have a different regularization parameter, or on a network-wide basis, such that a single regularization parameter is applied to the entire neural network, and neurons and/or connections/edges to be temporarily ignored are randomly selected from any layer(s) in the network.

Figure 3:
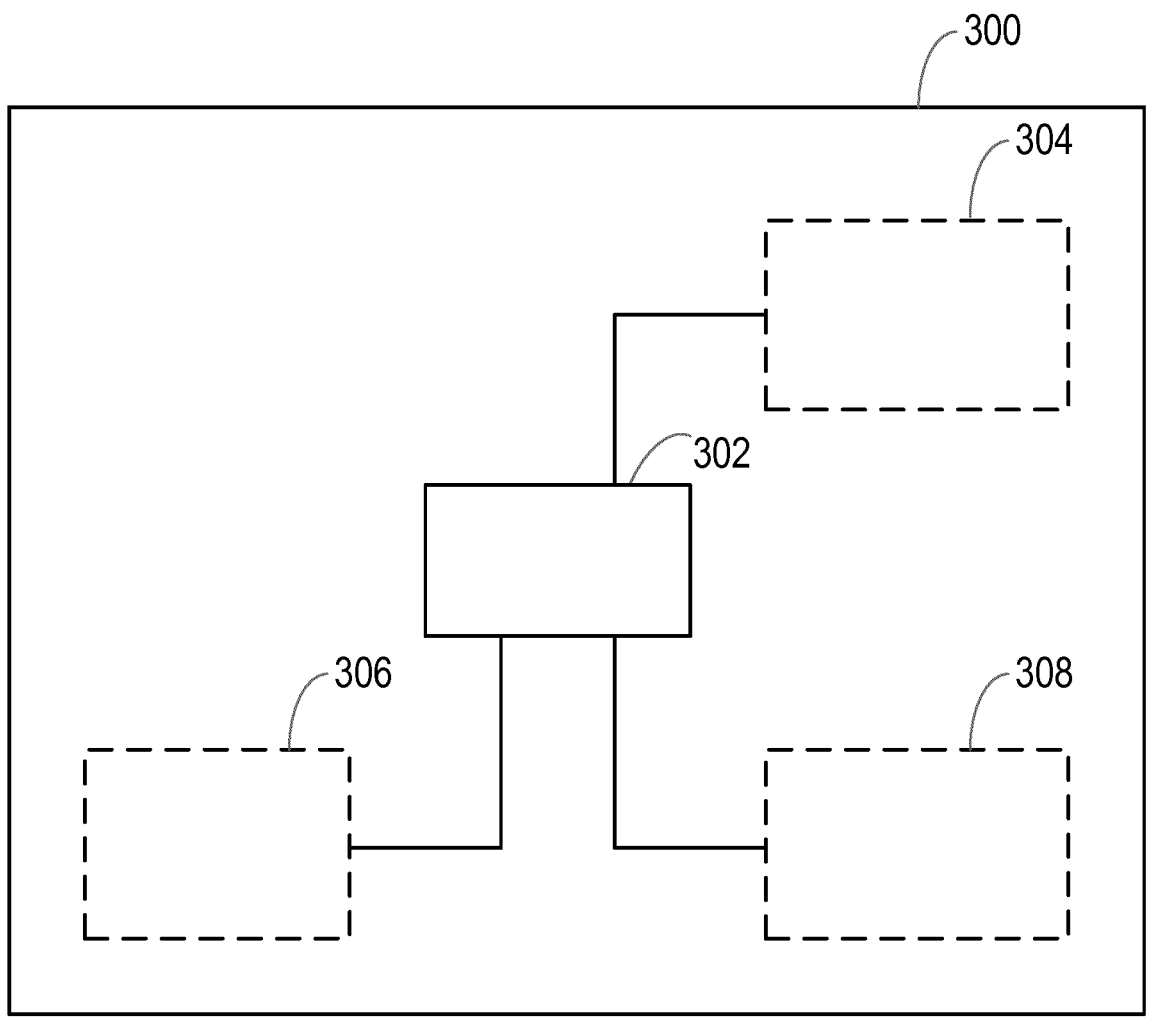
FIG. 3 is a simplified schematic of an example of a system for training a neural network model.

Reference is now made to FIG. 3, which shows a block diagram of a system 300 according to an embodiment that can be used for training a neural network model. With reference to FIG. 3, the system 300 comprises a processor 302 that controls the operation of the system 300 and that can implement the methods described herein.

The system 300 further comprises a memory 306 comprising instruction data representing a set of instructions. The memory 306 may be configured to store the instruction data in the form of program code that can be executed by the processor 302 to perform the methods described herein. In some implementations, the instruction data can comprise a plurality of software and/or hardware modules that are each configured to perform, or are for performing, individual or multiple steps of the method described herein. In some embodiments, the memory 306 may be part of a device that also comprises one or more other components of the system 300 (for example, the processor 302 and/or one or more other components of the system 300). In alternative embodiments, the memory 306 may be part of a separate device to the other components of the system 300.

In some embodiments, the memory 306 may comprise a plurality of sub-memories, each sub-memory being capable of storing a piece of instruction data. In some embodiments where the memory 306 comprises a plurality of sub-memories, instruction data representing the set of instructions may be stored at a single sub-memory. In other embodiments where the memory 306 comprises a plurality of sub-memories, instruction data representing the set of instructions may be stored at multiple sub-memories. For example, at least one sub-memory may store instruction data representing at least one instruction of the set of instructions, while at least one other sub-memory may store instruction data representing at least one other instruction of the set of instructions. Thus, according to some embodiments, the instruction data representing different instructions may be stored at one or more different locations in the system 300. In some embodiments, the memory 306 may be used to store information, data (e.g. images), signals and measurements acquired or made by the processor 302 of the system 300 or from any other components of the system 300.

The processor 302 of the system 300 can be configured to communicate with the memory 306 to execute the set of instructions. The set of instructions, when executed by the processor 302 may cause the processor 302 to perform the method described herein. The processor 302 can comprise one or more processors, processing units, multi-core processors and/or modules that are configured or programmed to control the system 300 in the manner described herein. In some implementations, for example, the processor 302 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

Returning again to FIG. 3, in some embodiments, the system 300 may comprise at least one user interface 304. In some embodiments, the user interface 304 may be part of a device that also comprises one or more other components of the system 300 (for example, the processor 302, the memory 306 and/or one or more other components of the system 300). In alternative embodiments, the user interface 304 may be part of a separate device to the other components of the system 300.

A user interface 304 may be for use in providing a user of the system 300 (for example, a researcher such as a medical researcher, a medical professional, or any other user of a neural network model) with information resulting from the method according to embodiments herein. The set of instructions, when executed by the processor 302 may cause processor 302 to control one or more user interfaces 304 to provide information resulting from the method according to embodiments herein. Alternatively or in addition, a user interface 304 may be configured to receive a user input. In other words, a user interface 304 may allow a user of the system 300 to manually enter instructions, data, or information. The set of instructions, when executed by the processor 302 may cause processor 302 to acquire the user input from one or more user interfaces 304.

A user interface 304 may be any user interface that enables rendering (or output or display) of information, data or signals to a user of the system 300. Alternatively or in addition, a user interface 304 may be any user interface that enables a user of the system 300 to provide a user input, interact with and/or control the system 300. For example, the user interface 304 may comprise one or more switches, one or more buttons, a keypad, a keyboard, a mouse, a mouse wheel, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 3, the system 300 may also comprise a communications interface (or circuitry) 308 for enabling the system 300 to communicate with interfaces, memories and/or devices that are part of the system 300. The communications interface 308 may communicate with any interfaces, memories and devices wirelessly or via a wired connection.

It will be appreciated that FIG. 3 only shows the components required to illustrate this aspect of the disclosure and, in a practical implementation, the system 300 may comprise additional components to those shown. For example, the system 300 may comprise a battery or other power supply for powering the system 300 or means for connecting the system 300 to a mains power supply.

The system 300 is for training a neural network model, and makes use of a regularization parameter to reduce the likelihood, and/or the effect of, overfitting by the model. Briefly, the system 300 is configured for training a neural network model, and comprises the memory 306 comprising instruction data representing a set of instructions; and the processor 302 configured to communicate with the memory 306 and to execute the set of instructions. The set of instructions, when executed by the processor 302, cause the processor 302 to receive training data comprising a first set of annotated images, receive test data comprising a second set of annotated images, train the neural network model using the training data, based on an initial regularization parameter, and iteratively perform a modifying process. The modifying process comprises testing the trained neural network model using the test data to determine a loss function of the trained neural network model for the test data; adjusting the initial regularization parameter based on the loss function of the neural network model for the training data and the loss function of the neural network model; and re-training the neural network model using the training data, based on the adjusted regularization parameter. The modifying process is performed until it is determined that the loss function for the training data and the loss function for the test data have both converged to a steady state.

Such a system is based on the realization that adjusting the regularization parameter based on a comparison between a loss function of training data and test data enables a determination of whether overfitting has occurred to be performed. Thus, modifications to the regularization parameter can be made dependent on a determination of whether a neural network is over/underfitting.

Generally, the neural network model may comprise a feed forward model (such as a convolutional neural network, an auto-encoder neural network model, a probabilistic neural network model and a time delay neural network model), a radial basis function network model, a recurrent neural network model (such as a fully recurrent model, a Hopfield model, or a Boltzmann machine model), or any other type of neural network model comprising weights.

The model may be used to classify data. The data may be any type of data, such as data comprising images (e.g. image data), data comprising text such as documents or records, audio data or any other type of data that can be classified by neural network models. In some embodiments, the data comprises medical data, such as medical images (e.g. x-ray images, ultrasound images, etc.) or medical records.

In some embodiments, the model may be trained to produce one or more classifications (e.g. labels) for data. In some embodiments, the model may be used to classify medical imaging data of a particular anatomical structure, such as the vascular system, heart, or any other anatomical structure.

Figure 4:
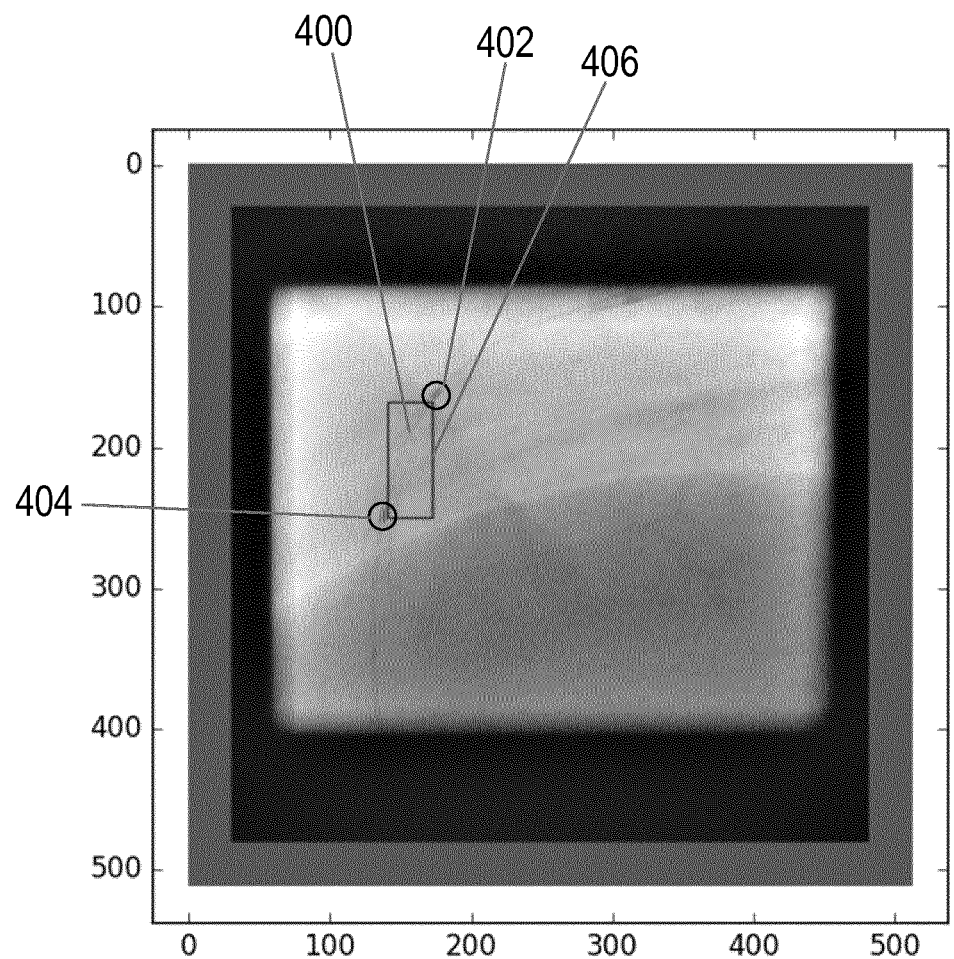
FIG. 4 is an example of a medical image including a stent.

In some embodiments, the model may be used to detect the presence of an object in an image. In other embodiments, the model may be used to identify the location of an object in an image. An example image comprising a stent is shown in FIG. 4 which shows a stent 400, either end of which is marked by two balloon markers 402 and 404. In some embodiments, the model may be trained to process images such as that shown in FIG. 4 and produce an output indicating whether a stent is present in a medical image (e.g. a stent detection model). In this embodiment, the output layer of the model may have two neurons suitable for binary output, for example, the first model may output that a stent is present, or that a stent is not present in an image.

In other embodiments, the model may be trained to process data such as the data shown in FIG. 4 but, rather than detecting the presence of a stent, the model may be trained to produce a different output. A bounding box 406 is also shown in FIG. 4, indicating the extent of the stent 400. In some embodiments, the output layer of the model may comprise four neurons, a first pair corresponding to the x-y coordinates of the center of the bounding box 406 surrounding the stent and a second pair corresponding to the width and height of the bounding box. In this way, the location of the stent 400 can be output for each medical image. It will be appreciated that these are merely examples, however, and that the output layer of the model may comprise other numbers of neurons that produce different outputs. For example, instead of producing coordinates and dimensions of a bounding box (e.g. the box 406), the model may be trained to output the x,y coordinates of one or both ends of the stent (e.g. the balloon markers 402, 404) in the image.

Referring again to FIG. 3, as noted above, the set of instructions, when executed by the processor 302, cause the processor to receive training data comprising a first set of annotated images. The training data may, for example, include a plurality of images, such as medical images, with annotations (e.g. labels) marked on the images, or otherwise included in image data associated with the plurality of images. As in the example given above, the annotations may include an indication of the presence of (or absence of) an object (e.g. a stent) in an image, or the location (x,y coordinates and/or dimensions of a bounding box) of the object in the image. The annotations included in the images of the training data may be created or provided, for example, by a medical professional who has reviewed an image and indicated the presence of, and/or the location of, a particular object in the image.

As will be apparent to those familiar with neural networks, weights of neurons in one or more layers of the neural network may be adjusted based on the training data. In order to reduce the effects of overfitting, an initial regularization parameter may be applied to the neural network model. As noted above, the regularization parameter may comprise at least one of a dropout parameter, relating to neurons in the neural network model, or a dropconnect parameter, relating to connections between neurons in the neural network model. In some embodiments, the regularization parameter may comprise a combination of dropout and dropconnect parameters such that some neurons are ignored and some connections between neurons are ignored during training.

The initial regularization parameter may be selected arbitrarily. In some embodiments, the initial regularization parameter may be given a predefined value, such as 0.5. A value of 0.5 causes 50% of the neurons or connections to be temporarily ignored. By "temporarily", is it meant that the proportion of neurons or connections ignored will change when the regularization parameter is changed to a different value. If the regularization value is set to 0, then no neurons or connections will be ignored. In some embodiments, the regularization parameter may be changed after one epoch (i.e. after all of the training data has been fed into the neural network once). In other embodiments, the regularization parameter may be changed when a batch (e.g. a subset of, say, 16, 32, 64, 128 or 256 items) of the total training data has been fed into the neural network (i.e. when a step of training has been completed).

As noted above, training the neural network model involved updating weights of neurons in the model as training data is presented to the model and as the model "learns" from the training data. Thus, in some embodiments, causing the processor 302 to re-train the neural network model may comprises causing the processor to set weights of neurons in one or more layers of the model based on weights of the neurons during the preceding iteration.

After an amount of training (e.g. after an amount of training data has been presented to the model, such as a number of epochs or after a loss function converges to a steady state) the regularization parameter is adjusted and the neural network model is re-trained, or trained further, with the adjusted regularization parameter (i.e. with a different proportion of neurons or connections ignored in the model). This cycle of adjusting the regularization parameter and re-training the model may be repeated and, in this way, the adjustment of the regularization parameter is said to be iterative. Re-training the neural network model may involve presenting training data to the model which has already been used to train the model. However, with a different regularization parameter, a different combination of neurons and/or connections are active in the model and, therefore, training of the model may be improved even when the same set of training data is presented. The re-training of the neural network model with an adjusted dropout parameter may be considered to be a fine-tuning process, whereby the normal training of the model (e.g. by updating weights of the model) is improved as a result of the varying regularization parameter.

As training progresses, and weights of neurons in the neural network are updated, a loss function (also referred to as a cost function) of the model may reduce. The loss function of a model quantifies how accurately the model performs. For example, in a neural network model used for object localization (e.g. a model used to determine the location of an object in a medical image), the loss function may initially be relatively high (e.g. the location of the object may be accurate to within around 20 pixels), as the model is in the early stages of training. As the training of the model progresses, the loss function may improve (i.e. reduce) as the location of the object is more accurately determined by the model (e.g. accurate to within around 5 pixels). The accuracy of the model may reach a maximum, at which point, further training of the model is unlikely to further improve the accuracy of the model, and the loss function fails to reduce further. At this stage, the loss function is said to have converged, or minimized. It will be appreciated that a maximum accuracy of the model may not constitute an accuracy of 100%, but may constitute an accuracy which is the best achievable accuracy given the parameters of the neural network model and the training data available.

As previously noted, the set of instructions when executed by the processor 302, furthers cause the processor to receive test data comprising a second set of images; and test the neural network model using the test data. The test data may, for example, comprise a second set of images which is different from the first set of images in the training data. The loss function associated with test data, which may also be referred to as hold-out data, is used alongside the loss function associated with the training data to determine how to vary parameters of the neural network model, such as the regularization parameter. For example, when the trained neural network is tested using the test data (i.e. when the second set of images is presented to the neural network model in a testing stage), a line-search technique may be used to identify a regularization parameter that results in the smallest loss function of the model (i.e. the regularization parameter that minimizes the loss function). In some examples, the amount by which to increase or decrease the regularization parameter may be determined based on heuristics. As explained below, the change to the regularization parameter may be implemented by multiplying the parameter by some constant (i.e. greater than 1 to increase the parameter, and less than 1 to decrease the parameter). Thus, the adjustment made to the regularization parameter may be based on the change in the loss function between iterations of testing the neural network.

The choice of how to vary the regularization parameter between iterations of re-training the neural network model may be made based on how the loss function of the model changes (for the training data and the test data). In some embodiments, causing the processor 302 to adjust the regularization parameter may comprise causing the processor to increase the regularization parameter when it is determined that the loss function of the model is higher for the test data than for the training data, and the loss function has minimized or converged for the training data. If the loss function of the model for the training data has minimized (i.e. converged to an optimum value) but the loss function for the test data is relatively higher, then this may be a sign of overfitting. Thus, increasing the regularization parameter in such a scenario may help to stop the model from overfitting the data. The amount by which the regularization parameter is increased may be based on the results seen from presenting the test data to the neural network model. The regularization parameter may, in some embodiments, be increased by a factor $\alpha$ (i.e. $\alpha$ multiplied by the current regularization parameter), where $\alpha>1$ (but not so large as to make the regularization parameter greater than 1). This adjustment would, of course, result in an increased number of neurons or connections being temporarily ignored in the next iteration of training the model. The neural network model is then be re-trained using the increased regularization parameter.

Causing the processor 302 to adjust the regularization parameter may, in some embodiments, comprise causing the processor to decrease the regularization parameter when the loss function for the training data is greater than or equal to the loss function for the test data. This may indicate that the neural network is underfitting.

In some embodiments, causing the processor to adjust the regularization parameter may comprise causing the processor to decrease the regularization parameter when it is determined that the loss function of the model has converged to a steady state for the training data and the test data. It will be apparent to the skilled person that the loss function for the training data and the test data do not need to converge to the same value. In such a scenario, since the loss function for the model for both the training data and the test data has converged (whether it has converged to a relatively high value or to a value near to or at the optimal value), it may be determined that the neural network model is "learning" well from the training data. Thus, the learned weights of the neurons are used as initial weights for a new training process (e.g. with new training data), and the regularization parameter is reduced. The regularization parameter may be decreased, for example by a factor $\beta$ (i.e. $\beta$ multiplied by the current regularization parameter), where $0<\beta<1$. This adjustment would, of course, result in fewer neurons or connections being temporarily ignored in the next iteration of training the model. As above, the amount by which the regularization parameter is decreased may be based on the results seen from presenting the test data to the neural network model. The neural network model may then be re-trained using the decreased regularization parameter, and the updated neuron weights.

It has been found that, by applying the above-described technique, training of the neural network model may be achieved quickly and efficiently. The set of instructions, when executed by the processor 302, may, in some embodiments, further cause the processor to conclude training of the neural network model when it is determined that the loss function is minimized (or converged) for the training data and the test data. Thus, once the loss function of the model is seen to converge, and the value at which the loss function converges is at its optimal value (i.e. as small as possible), the loss function can be considered to have been minimized, such that no further training of the model is required. Training of the neural network model is, therefore, concluded at this stage.

The adjustment of the regularization parameter is thereby based on the convergence of the loss function of the model. That is to say, as the loss function changes over the training process, the regularization parameter is adjusted accordingly, with the intention of causing the loss function to converge more rapidly and to a smaller (i.e. more optimum) value. In general, the regularization parameter is adjusted as the neural network model is trained, until the loss function converges to a steady state. In this context, a steady state is considered to be a state in which the loss function varies by less than a defined amount, or varies within a defined threshold. At the steady state, the loss function may be approximately constant. In some embodiments, the loss function of the model may be considered to have converged to a steady state when the loss function changes by less than a defined amount between subsequent iterations.

As noted above, the neural network model may be used to classify or annotate images, for example, annotating images with an indication or location of an object in the image. Thus, in some embodiments, the training data may comprise images annotated with at least one of: an indication of the presence of an object in the image; and an indication of the location of an object in the image. In some embodiments, the training data may comprise medical images. However, those skilled in the relevant art will understand that the systems and methods described herein may be used in connection with neural network models trained on other types of data.

Figure 5:
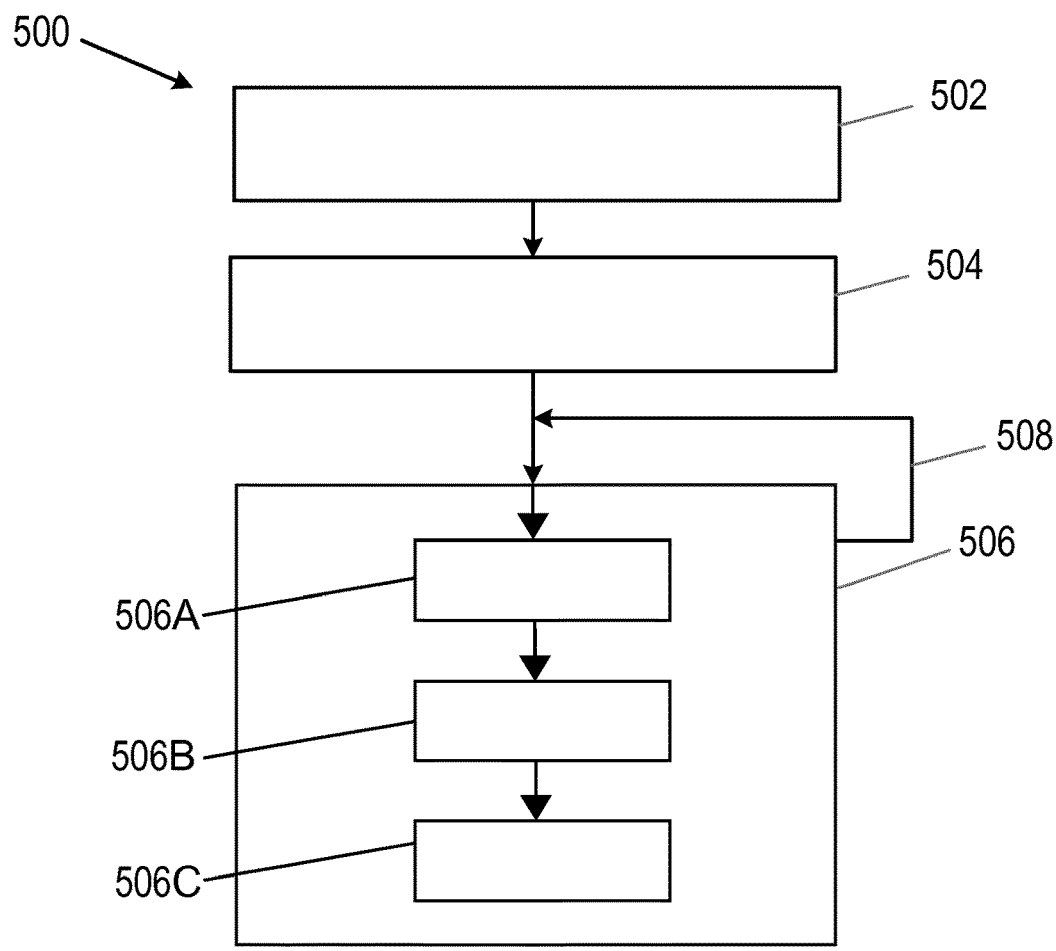
FIG. 5 is a flowchart of an example of a method of training a neural network model.

A further aspect of the invention relates to a method for training a neural network model. FIG. 5 illustrates a computer-implemented method 500 for training a neural network model according to embodiments. The illustrated method 500 can generally be performed by or under the control of the processor 302 of the system 300. The method 500 may be partially or fully automated according to some embodiments.

The method 500 comprises, at step 502, receiving training data comprising a first set of annotated images. As noted above, the images may include medical images, and the annotations in the images may include an indication of the presence of an object (e.g. a stent), and/or an indication of the location of the object.

At step 503, the method 500 comprises receiving test data comprising a second set of annotated images.

At step 504, the method 500 comprises training the neural network model using the training data, based on an initial regularization parameter. The initial regularization parameter may be selected arbitrarily, or randomly, and is representative of the proportion of neurons or connections between neurons that are temporarily ignored or omitted during training.

The method 500 comprises, at step 506, iteratively performing steps of: testing 506A the trained neural network model using the test data to determine a loss function of the trained neural network model for the test data; adjusting 506B the initial regularization parameter based on the loss function of the neural network model for the training data and the loss function of the neural network model; re-training 506C the neural network model using the training data, based on the adjusted regularization parameter, wherein the iterative steps are performed until it is determined that the loss function for the training data and the loss function for the test data have both converged to a steady state.

The iterative adjustment of the regularization parameter is indicated by the arrow 508.

Figure 6:
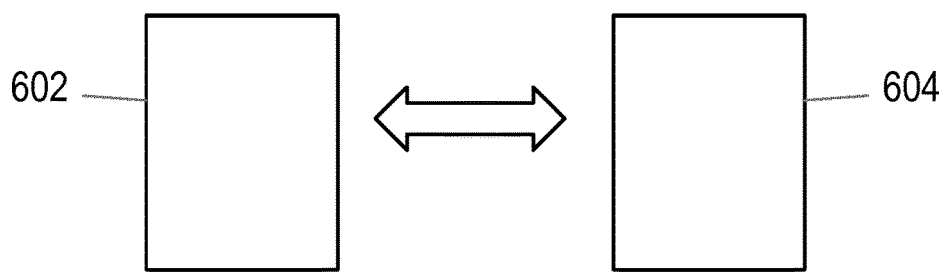
FIG. 6 is a simplified schematic of an example of a computer-readable medium and a processor.

According to a further aspect, there is also provided a computer program product. FIG. 6 shows, schematically, a computer readable medium 602 and a processor 604. According to embodiments, a computer program product comprises a computer readable medium 602, the computer readable medium having computer readable code embodied therein, the computer readable code being configured such that, on execution by a suitable computer or processor 604, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein. The processor 604 may comprise, or be similar to the processor 302 described above.

The processor 302, 604 can comprise one or more processors, processing units, multi-core processors or modules that are configured or programmed to control the system 300 in the manner described herein. In particular implementations, the processor 302, 604 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system configured for training a neural network model, the system comprising:
    a memory comprising instruction data representing a set of instructions; and
    a processor configured to communicate with the memory and to execute the set of instructions, wherein the set of instructions, when executed by the processor, cause the processor to:
        receive training data comprising a first set of annotated images;
        receive test data comprising a second set of annotated images;

train the neural network model using the training data, based on an initial regularization parameter to determine a training loss function of the neural network model; and
iteratively perform iterative steps of:
after the neural network model has been trained, testing the neural network model using the test data to determine a testing loss function of the neural network model for the test data;
adjusting the initial regularization parameter based on the training loss function and the testing loss function;
re-training the neural network model using the training data, based on the adjusted initial regularization parameter; and
redetermining the training loss function based on the re-training;
wherein, the processor is further configured to iteratively perform the iterative steps until the training loss function and the testing loss function have both converged to a steady state.

2. The system according to claim 1, wherein the initial regularization parameter comprises at least one of a dropout parameter, relating to neurons in the neural network model, or a dropconnect parameter, relating to connections between neurons in the neural network model.

3. The system according to claim 1, wherein the adjustment made to the initial regularization parameter is based on a difference between the training loss function and the testing loss function.

4. The system according to claim 1, wherein causing the processor to adjust the initial regularization parameter comprises causing the processor to increase the initial regularization parameter when it is determined that the testing loss function is higher than the training loss function, and the training loss function has minimized for the training data.

5. The system according to claim 1, wherein causing the processor to adjust the initial regularization parameter comprises causing the processor to decrease the initial regularization parameter when it is determined that the training loss function of the neural network model is higher than the testing loss function.

6. The system according to claim 1, wherein causing the processor to train the neural network model or re-train the neural network model comprises iteratively training the neural network model using the training data until the training loss function converges to a steady state.

7. The system according to claim 6, wherein causing the processor to re-train the neural network model comprises causing the processor to set weights of neurons in one or more layers of the neural network model based on weights of the neurons during a preceding iteration.

8. The system according to claim 6, wherein the training loss function is considered to have converged to the steady state when the training loss function changes by less than a defined amount between subsequent iterations.

9. The system according to claim 1, wherein the training data and the test data both comprise images annotated with at least one of:
an indication of a presence of an object in the image; and
an indication of the location of an object in the image.

10. The system according to claim 9, wherein the training data and the test data both comprise medical images.

11. The system according to claim 1, wherein the initial regularization parameter defines a proportion of neurons or connections between neurons to be temporarily excluded from a particular layer of the neural network model during training.

12. A method of training a neural network model, the method comprising:
receiving training data comprising a first set of annotated images;
receiving test data comprising a second set of annotated images;
training the neural network model using the training data, based on an initial regularization parameter to determine a training loss function of the neural network model; and
iteratively performing iterative steps of:
after the neural network model has been trained, testing the neural network model using the test data to determine a testing loss function of the neural network model for the test data;
adjusting the initial regularization parameter based on the training loss function and the testing loss function;
re-training the neural network model using the training data, based on the adjusted initial regularization parameter; and
redetermining the training loss function based on the re-training;
wherein the method is to iteratively perform the iterative steps until the training loss function and the testing loss function have both converged to a steady state.

13. A computer program product comprising a non-transitory computer readable medium, the computer readable medium having computer readable code embodied therein, the computer readable code being configured such that, on execution by a suitable computer or processor, the computer or processor is caused to perform the method of claim 12.

* * * * *